United States Patent Office 3,570,139
Patented Mar. 16, 1971

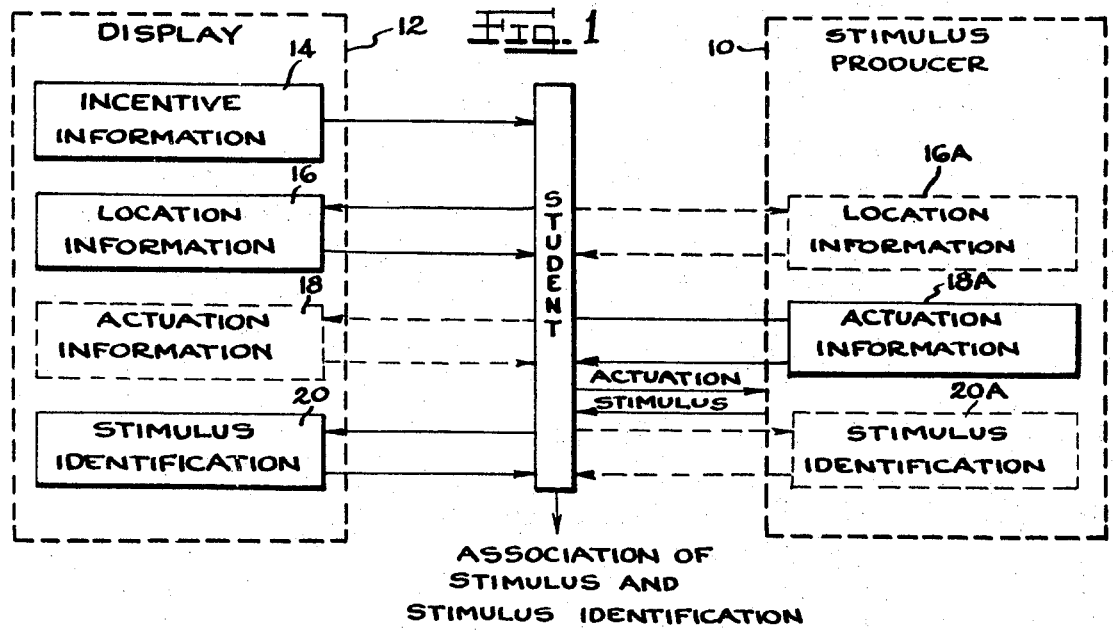
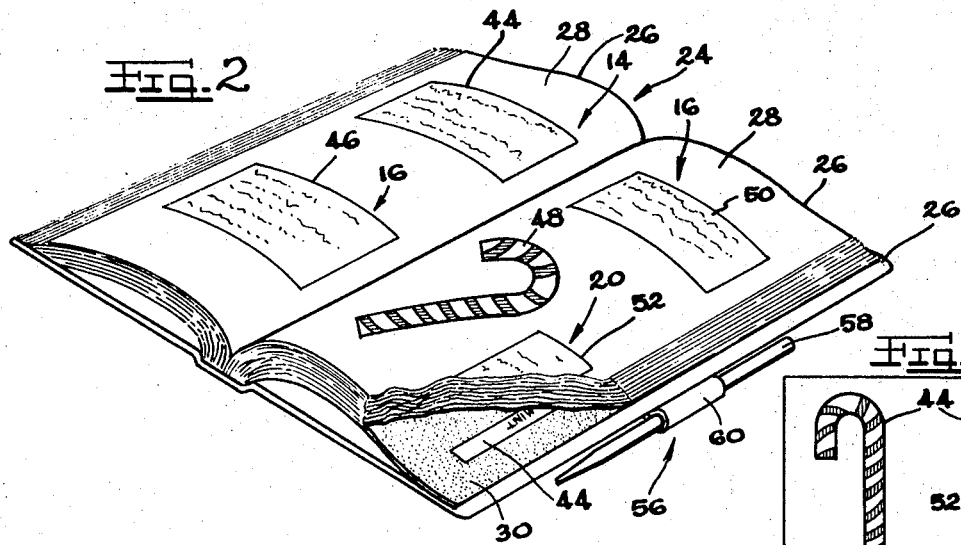
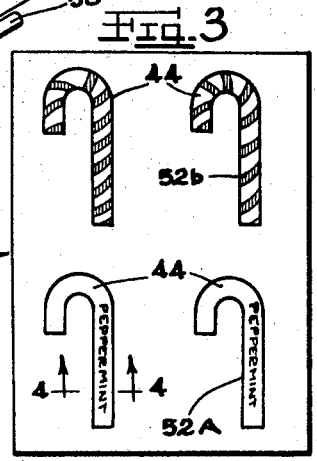
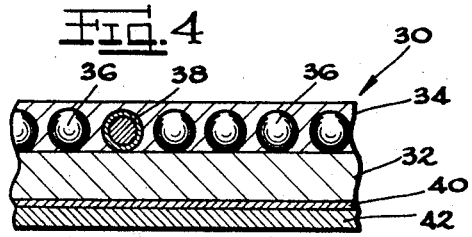

3,570,139
TEACHING APPARATUS
Janice S. Ladd, 677 Fairview Ave., Elmhurst, Ill. 60126, and Marilyn H. Emerson, 405 E. Lake Shore Drive, Barrington, Ill. 60010
Filed Aug. 18, 1969, Ser. No. 850,724
Int. Cl. G09b 1/00
U.S. Cl. 35—8                                   17 Claims

ABSTRACT OF THE DISCLOSURE

Teaching apparatus for establishing an association between a selected chemical sense stimulus and an identification thereof. A stimulus producer is provided to produce a stimulus of a chemical sense upon actuation, preferably in the form of a sheet with a coating including rupturable capsules containing a substance which produces the stimulus. A display is also provided which includes an indication of a selected location for the stimulus producer and a stimulus identification adjacent to the selected location for providing an identification of the stimulus. Positioning of the stimulus producer at the location and actuation of the stimulus producer produces the stimulus in physical proximity to the identification means so that an association between the stimulus and the identification is established.

This invention relates to teaching apparatus and, more particularly, to apparatus for establishing associations between selected stimuli of the chemical senses and identifications thereof.

In recent years, various methods and apparatus have been developed for increasing the efficiency of the learning process. Many of such devices are based upon psychological principles of learning which hold that learning is aided if the student is subjected to a stimulus and called upon to make a response which is thereupon reinforced by a reward such as an indication of its correctness. It has been found that learning is enhanced by physical involvement of the student in the response, such as by writing the answer, as contrasted with learning situations in which no overt response is required.

While the theory on which such apparatus is based appears to be sound, such devices as have been developed are primarily directed to the teaching of relatively advanced intellectual concepts such as foreign languages, academic subjects and the operation of machinery. Usually such apparatus utilizes only the student's senses of sight, hearing, and perhaps, touch, neglecting the chemical senses of smell and taste. Moreover, such apparatus may be quite complex including electronic display panels or "scrambled books" in which the various branches of the instructional program can be pursued only by selective and precise reference to predetermined pages in a bound volume.

Due to the complexity of the devices little attention has been paid to the utilization of such principles of learning in the teaching of elementary concepts to small children. Furthermore, since the apparatus utilizes only the higher senses of sight and hearing, transfer of the more advanced techniques to the teaching of small children is difficult. Yet the specialized sense organs for chemical stimuli, having evolved earlier and being more closely associated with survival, are relatively more highly developed in small children. Moreover, contrary to prior theories, even infants have been found capable of integrating properly presented information, and early sensory stimulation of the senses has been found to have lasting beneficial effect on intelligence. See Modern Medicine, volume 34, Jan. 17, 1966, "Tests Show Day Old Infants Can Learn, Early Handling Can Influence Behavior."

Accordingly, there is a need for instructional apparatus for use in the early development of children. A particular need is for such apparatus utilizing the chemical senses of smell and taste since these senses are relatively more significant to children of early ages. It will be appreciated that such apparatus, while most useful for aiding the development of small children, may also be utilized with older children and adults where an appreciation of different odors or flavors is desired to be developed.

It is, therefore, an important object of this invention to provide instructional apparatus for establishing associations between selected stimuli of the chemical senses and identifications thereof.

Another object of the invention is to provide such instructional apparatus which is relatively simple in construction and operation.

Still another object of the invention is to provide such instructional apparatus which is operable by relatively small children.

A further object of the invention is to provide instructional apparatus utilizing the chemical senses which maximizes the involvement of the student to reinforce learning.

Other objects and advantages of the invention will become apparent from the following description and the accompanying drawings in which:

FIG. 1 is a schematic illustration of the learning process utilizing apparatus embodying the present invention;

FIG. 2 is a partially broken away perspective view of teaching apparatus showing various functions of the invention;

FIG. 3 is a detailed plan view of the stimulus producing means shown in FIG. 2, and FIG. 4 is an enlarged fragmentary sectional view of the stimulus producing means shown in FIG. 3 taken along line 4—4.

Very generally, as illustrated in FIG. 1, the present invention comprises a stimulus producing means 10 which is capable of producing a selected stimulus of a chemical sense upon actuation thereof and display means 12 adapted for presenting information to a student. The display 12 includes incentive means 14 for presenting information to the student which provides an incentive for the student to operate the apparatus. The display 12 also includes location means 16 for indicating a selected position on the display for the stimulus producing means. Such information may also be provided, as indicated in dashed lines in additional location means 16A, included in the stimulus producer. In response to the incentive information, the student refers to the location information and, acting thereupon, positions the stimulus producer 10 in the selected location on the display means.

Information concerning the actuation of the stimulus producer is then furnished to the student by instruction means which means is designated by the numeral 18 and may comprise part of the display 12, or, preferably as designated by the numeral 18A, comprises part of the stimulus producer itself, in order to increase the physical involvement of the student in the learning process. In response to the actuation information the student actuates the stimulus producer 10 to produce the chemical sense stimulus. The previously mentioned selected location for the stimulus producer 10 is adjacent to an identification means 20 for the stimulus so that the stimulus is provided in physical proximity to the stimulus identification, thus establishing an assocaition between the stimulus and the identification. Additional stimulus identification means 20A may also be provided as part of the stimulus producer to further reinforce the desired association.

More specifically, as illustrated in FIGS. 2–4, a preferred embodiment of the apparatus comprises an assembly 24 of sheets bound into the form of a book by conventional means. The sheets 26 include at least one display sheet 28 and at least one stimulus sheet 30. The "book" may include conventional textual and illustrative material such as simple children's stories, especially designed, however, to stimulate the student's interest in the exercise of the chemical senses of smell and taste.

An example of such textual material for children would be a story concerning a character identified with a particular chemical stimulus, say the odor of peppermint or of lemons. The child's curiosity as to the nature of the smell is aroused by the story.

A feature of the apparatus illustrated in FIGS. 2–4 is that the stimulus sheet 30 comprises the previously mentioned stimulus producer 10, in the form of a base 32 of material having a coating 34 on one side thereof which includes a plurality of rupturable capsules 36 containing a substance 38 capable of producing the selected chemical stimulus, e.g., the odor of peppermint. Such a coating may be produced utilizing a variety of processes known in the art such as that shown in U.S. Pat. No. 3,179,600. That patent shows a specific application where the substance included in the capsules contains a dye; however, substances which produce either flavors or odors may be substituted for the dye. Rupture of the capsules by pressure applied to the coating releases the substance contained therein. A particular advantage of this form of stimulus producer is that the stimulus is produced only upon rupture of the capsules, thus requiring a physical interaction of the student with the apparatus so as to reinforce the learning process and also allowing the storage of the apparatus before use and after initial use for long periods of time without affecting its operability. A further advantage is that such sheets may easily be bound in the form of a conventional book.

Preferably, the stimulus sheet 30 includes separable portions 44, which may be perforated in outline for ease of removal from the rest of the sheet 30 and shaped to resemble an object which produces the desired stimulus to provide an additional identification of the stimulus. Various colors and designs may also be imprinted upon the sheet 30 so that identification means on the display sheets 28 may be duplicated or supplemented by similar means on the stimulus sheet. Thus, as illustrated in FIG. 3 the stimulus sheet 28 may have portions perforated in the shape of peppermint canes, and labeled as at 52A with the name of the scent or patterned and colored as at 52B to resemble peppermint canes.

As illustrated, the stimulus sheet 30 also includes an adhesive layer 40 on the opposite side of the base 32 from the coating 34 for fastening the stimulus sheet to the display sheet 28. The adhesive layer 40 may be a pressure sensitive adhesive material covered by a removable protective sheet 42 of nonadhesive material to prevent undesired adhesion.

Returning now to the display means 10, the display sheets 28 include incentive means 14 integrated with the text of the story and illustrative material for providing an incentive to the student to operate the apparatus. In the specific example of a teaching apparatus for young children, this may be a display section 44 including a legend such as "You can smell the peppermint canes too." The display sheets also include location means 16 for providing information to the student, indicating a selected location for the stimulus producing means on the display sheets. This, too, may be a display section 46 with a legend, coupled with a picture or outline 48 of the object which produces the stimulus. As illustrated, the picture is of a pepperimint candy cane and the legend may be "Stick the pepperiment paper on the picture of the cane." Similar directions may be incorporated in the stimulus sheet 28.

As also shown in the drawings the display sheets 26 include instruction means 18 for presenting information as to the actuation of the stimulus producer. This too may be a display section 50 with a legend such as "Scratch the pepperiment cane and sniff." This will cause the capsules 38 to rupture releasing essential oils which produce the scent or taste of peppermint. It will be apparent that such a legend may also be incorporated on the stimulus sheet 28 to provide additional certainty of execution by the student.

The selected location for the stimulus producing means on the display sheet is adjacent to an identification means 20 for the stimulus, which may be another display section 52 such as "This is the smell of peppermint." Thus the physical proximity of the stimulus and the identification produces a mental association which constitutes learning by the student. It will be appreciated that not only the verbal identification but also the shape and color of the object represented by the portion of the stimulus sheet 28 attached to the display sheet provide an identification which reinforces the learning process. Thus learning proceeds even if the child cannot himself read the identification.

An additional feature, illustrated in FIG. 2, is that actuation means 56 may be provided for actuating the stimulus procedure. As shown, this actuation means comprises a stylus 58, removably attached to the assemblage of sheets as by a loop 60. The student may be directed to press the point of the stylus against the stimulus producing sheet and to smell or taste the stylus, thus reinforcing the identification of the odor or taste.

Thus it may be seen that an improved teaching apparatus has been provided which is especially suitable for developing an association of selected chemical stimuli such as odors or tastes with their identifications. By physically involving the student with the process of creating the stimulus, reinforcement of the identification is enhanced. The involvement of the chemical senses is particularly useful in stimulating the minds of young children whose chemical senses are relatively more fully developed.

Various changes and modifications may be made in the described apparatus without departing from the invention. For example, the pressure sensitive adhesive layer of the stimulus sheet could be a water soluble adhesive. The stimulus sheet could be placed in a pocket in the book, rather than bound therein and the form of the apparatus could be other than that of a book such as a game including a series of separate display panels. All of these variations would fall within the spirit and scope of the invention, features of which are set forth in the claims.

What is claimed is:

1. Teaching apparatus for establishing an association between a selected chemical sense stimulus and an identification thereof comprising stimulus producing means adapted to produce said selected stimulus of a chemical sense upon actuation thereof, and display means adapted to present information, said display means including location means for indicating a selected location for said stimulus producing means and stimulus identification means adjacent to said selected location for providing an identification of said seletced stimulus, so that positioning of said stimulus producing means at said selected location and actuation of said stimulus producing means produces said selected stimulus in physical proximity to said identification means, whereby an association between said selected stimulus and said identification thereof is established.

2. Teaching apparatus in accordance with claim 1 wherein said display means includes means for presenting information providing an incentive to position and actuate said stimulus producing means.

3. Teaching apparatus according to claim 1 including instruction means for presenting information concerning actuation of said stimulus producing means.

4. Teaching apparatus according to claim 3 wherein said instruction means is included in said stimulus producing means.

5. Teaching apparatus according to claim 3 wherein said instruction means is included in said display means.

6. Teaching apparatus according to claim 1 wherein said stimulus producing means includes additional stimulus identification means.

7. Teaching apparatus according to claim 1 wherein said stimulus producing means comprises means for producing an odor upon actuation thereof.

8. Teaching apparatus according to claim 1 wherein said stimulus producing means comprises means for producing a flavor upon actuation thereof.

9. Teaching apparatus according to claim 1 including means for actuating said stimulus producing means.

10. Teaching apparatus according to claim 1 wherein said location means is shaped so as to provide a representation of an object which produces said selected stimulus.

11. Teaching apparatus for establishing an association between a selected chemical sense stimulus and an identification thereof comprising a sheet of material having a coating on one side thereof including a plurality of rupturable capsules containing a substance capable of producing said selected stimulus, a display including an identification of said selected stimulus and an indication of a selected location for at least a portion of said sheet adjacent to said identification so that positioning of at least a portion of said sheet in said selected location and rupture of at least some of said capsules produces said selected stimulus in physical proximity to said identification whereby an association between said selected stimulus and said identification thereof is established.

12. Teaching apparatus in accordance with claim 11 wherein said sheet is divided into separable portions.

13. Teaching apparatus according to claim 12 wherein at least one of said separable portions is shaped so as to provide a representation of an object which produces said selected stimulus.

14. Teaching apparatus according to claim 12 wherein at least one of said separable portions is colored so as to provide a representation of an object which produces said selected stimulus.

15. Teaching apparatus according to claim 11 wherein said sheet is attached to said display means.

16. Teaching apparatus according to claim 11 wherein said sheet has an adhesive layer on the opposite side thereof from said coating for fastening said at least a portion of said sheet to said display means in said selected location.

17. Teaching apparatus according to claim 11 wherein said sheet includes information concerning actuation of said stimulus producing means.

References Cited
UNITED STATES PATENTS

| | | | |
|---|---|---|---|
| 1,884,197 | 10/1932 | Peterson et al. | 35—9 |
| 2,577,320 | 12/1951 | Fenyo | 40—160X |
| 3,179,600 | 4/1965 | Brockett | 252—188.3 |
| 3,190,837 | 6/1965 | Brynko et al. | 252—316 |
| 3,441,353 | 4/1969 | Claff | 401—132 |

WILLIAM H. GRIEB, Primary Examiner